(12) United States Patent
Kagermeier et al.

(10) Patent No.: US 7,079,022 B2
(45) Date of Patent: Jul. 18, 2006

(54) EMERGENCY ACTIVATION APPARATUS FOR A TECHNICAL DEVICE

(75) Inventors: Robert Kagermeier, Nürnberg (DE); Reiner Staab, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 63 days.

(21) Appl. No.: 10/799,207

(22) Filed: Mar. 12, 2004

(65) Prior Publication Data

US 2004/0201287 A1   Oct. 14, 2004

(30) Foreign Application Priority Data

Mar. 14, 2003   (DE) ................. 103 11 325

(51) Int. Cl.
*G08B 29/00* (2006.01)
(52) U.S. Cl. ............ 340/514; 340/509; 340/521; 340/535; 378/207
(58) Field of Classification Search ......... 340/514, 340/506, 509, 511, 513, 516, 517, 521, 522, 340/523–527, 532–535; 378/207, 209
See application file for complete search history.

(56) References Cited

U.S. PATENT DOCUMENTS

| 4,372,551 | A | * | 2/1983 | Yurdin | 482/57 |
| 5,166,588 | A | * | 11/1992 | Goldhorn | 318/558 |
| 5,490,297 | A | * | 2/1996 | Bradcovich et al. | 5/601 |
| 5,917,883 | A | * | 6/1999 | Khutoryansky et al. | 378/116 |
| 6,282,264 | B1 | * | 8/2001 | Smith et al. | 378/189 |
| 6,686,841 | B1 | | 2/2004 | Busch | |
| 2005/0116154 | A1 | | 6/2005 | Schilling | |

FOREIGN PATENT DOCUMENTS

| DE | 35 43 783 C2 | 12/1987 |
| DE | 299 06 910 U1 | 9/2000 |
| DE | 102 22 221 A | 3/2004 |

* cited by examiner

*Primary Examiner*—Jeffery Hofsass
*Assistant Examiner*—Daniel Previl
(74) *Attorney, Agent, or Firm*—Schiff Hardin LLP

(57) ABSTRACT

A safety device is provided that can be connected with a technical device and an associated emergency activation apparatus. The safety device includes a rail. The rail and emergency activation apparatus are fashioned such that the emergency activation apparatus can be attached to the rail and be shifted thereon. A test signal can be output by the rail that can be received by an emergency activation apparatus attached thereto independent of its shift position. A response signal can be output by the emergency activation apparatus that can be received by the rail independent of the shift position emergency activation apparatus. The safety device is fashioned such that a signal can be emitted to the technical device dependent on the receipt of the response signal. Via the signal, an emergency measure can be triggered, for example an emergency disconnection of the technical device such as an E-stop or, respectively, dead-man's function.

29 Claims, 2 Drawing Sheets

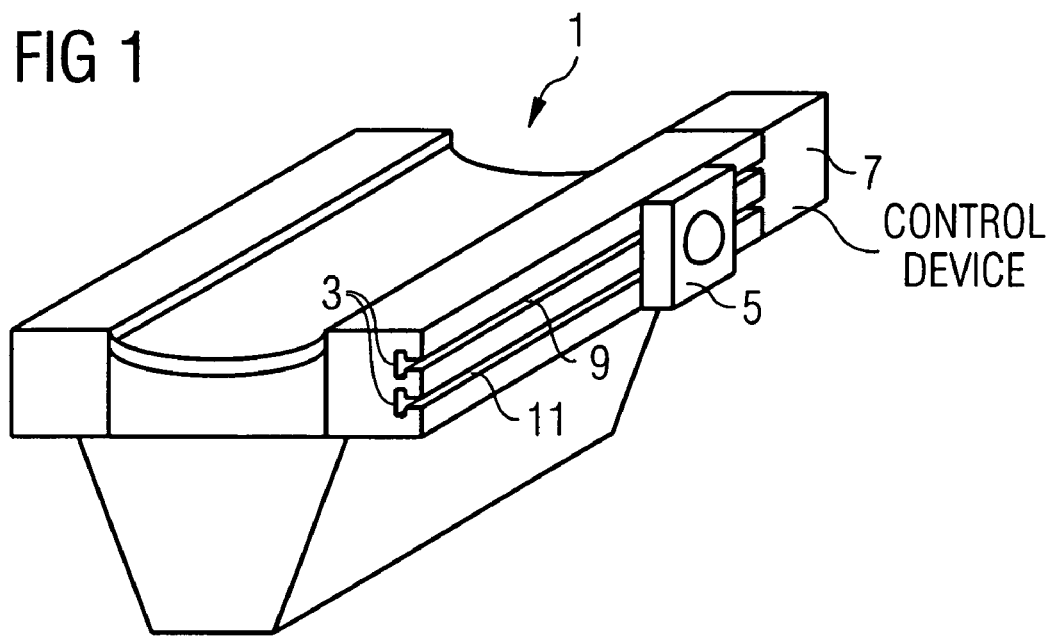
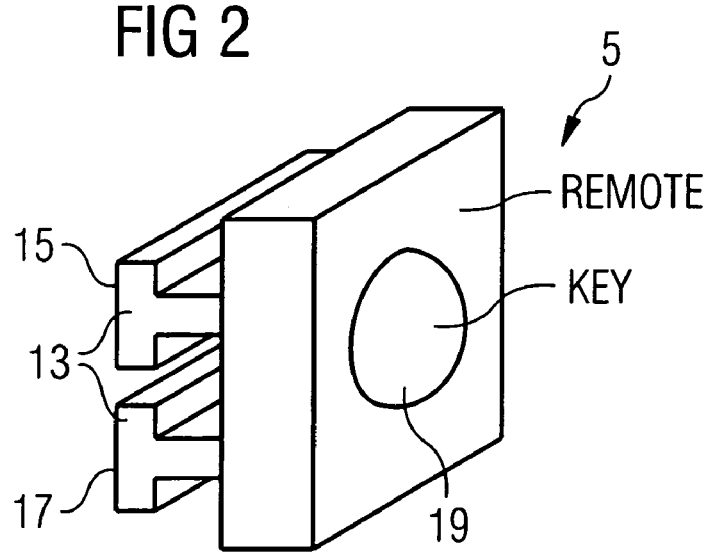

EMERGENCY ACTIVATION APPARATUS FOR A TECHNICAL DEVICE

BACKGROUND OF THE INVENTION

1. Field of the Invention

The present invention relates generally to a safety device for a technical device and an associated emergency activation apparatus.

2. Description of the Related Art

Monitoring elements for technical devices are increasingly realized as remote controls. On the one hand, this provides the advantage that the monitoring elements need not be located only in the immediate vicinity of the device, and on the other hand does not require additional cables for the signal line for a radio-supported or other wireless remote control.

However, wireless signal connections exhibit the disadvantage that their reliability can under certain circumstances be less than that of hardware-based connections. This difficulty is to be viewed as particularly critical with regard to emergency activation means, in particular with regard to what are known as E-stop switches or dead-man switches. E-stop switches serve to immediately stop or deactivate technical devices given unforeseeable situations that endanger the safety of the users, for example. Other emergency measures can, for example, provide for the deactivation of system parts, shielding of radiation sources or sources of chemical substances, or covering of mechanical devices such as saws.

In work environments with particularly high requirements for operating safety, it is therefore necessary to provide emergency activation means (to trigger emergency measures for technical devices) that are connected to the technical device via a hardware-based connection, for example via a cable or a direct contact. It should therewith be ensured that the emergency activation function is available at any time and independent of possible interferences with wireless signal connections. Emergency activation means can comprise the most varied structural and functional shapes and are integrated modularly into technical devices.

However, the requirement to physically connect the emergency activation means on a hardware basis has the disadvantage that they cannot be flexibly spatially positioned. While wirelessly connected operating elements are fundamentally freely movable, a emergency activation means connected via hardware can normally only be operated at a fixed position at the associated technical device. While the monitoring of such a device can by all means be possible with remote control, thus from anywhere, a disconnection due to an emergency is, for example, only possible at the emergency activation means itself.

SUMMARY OF THE INVENTION

The present invention provides a safety device for a technical device as well as an associated emergency activation means, that are connected with one another via a hardware-based connection, whereby the emergency activation means is, however, simultaneously spatially flexibly positionable.

Embodiments of the invention achieve this and other objects via a safety device as well as via an emergency activation means that is connected with a technical device and that has a rail that is fashioned so that the emergency activation means which is attached to it can be shifted. A test signal is emitted by the rail and received by the emergency activation means independent of the position on the rail. A response signal from the emergency activation means is received by the rail independent of the shifted position of the emergency activation on the rail, the safety device being fashioned such that a signal is emitted by the technical device dependent on receipt of the response signal.

BRIEF DESCRIPTION OF THE DRAWINGS

The preferred embodiments of the invention are show in the drawings as noted below.

FIG. 1 is an perspective view showing a patient positioning table with an emergency activation apparatus according to the invention;

FIG. 2 is a perspective view of the emergency activation apparatus according to a preferred embodiment of the invention;

DETAILED DESCRIPTION OF THE PREFERRED EMBODIMENTS

Figure 3:
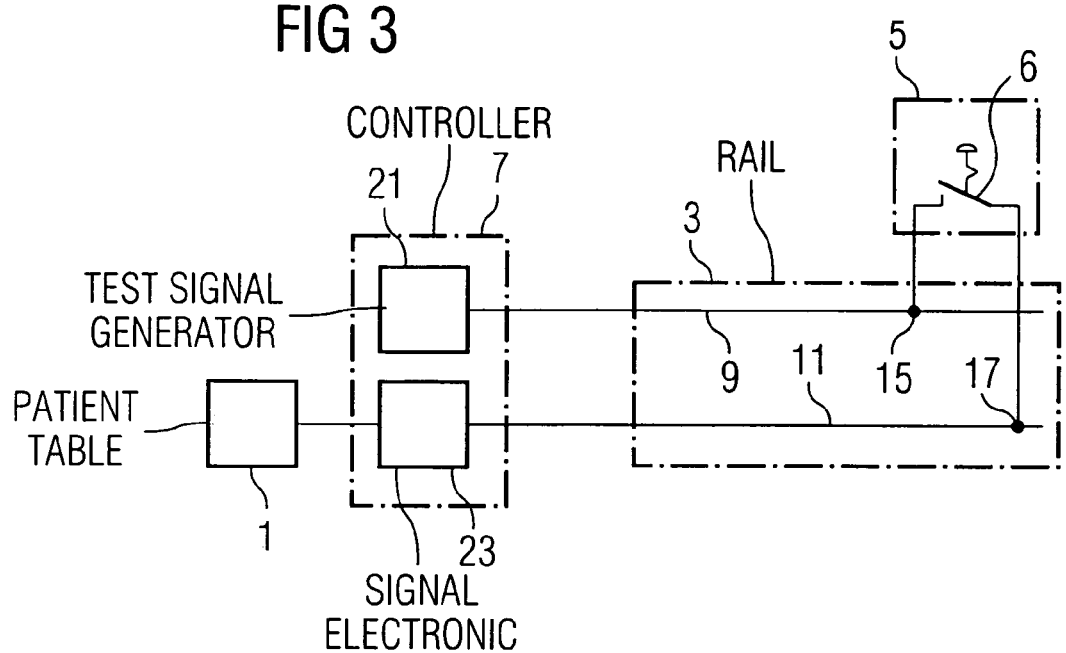
FIG. 3 is a functional block diagram of the electrical function groups of the patient positioning table and of the emergency activation means according to the invention.

A fundamental idea of the invention is to provide a safety device, connectable with a technical device, that comprises a rail that is fashioned such that an emergency activation means is attached to it and can be shifted along the rail in the longitudinal direction. A test signal can be emitted by the rail that can be received by an emergency activation means attached to the safety device, and namely independent of its longitudinal position in the rail. Via the emergency activation means, dependent on a receipt of the test signal, a response signal can be emitted that can in turn be received by the rail independent of the longitudinal position of the emergency activation means. A signal can be emitted to the technical device by the safety device, dependent on the receipt of the response signal. The signal can be used to trigger emergency measures for the technical device, for example to trigger an E-stop or dead-man's function.

The emergency activation means and the rail are mutually connected with one another via hardware, and the assembly therefore also satisfies strong safety requirements. At the same time, the emergency activation means can be shifted along the rail and can therefore be shifted and positioned flexibly with regard to position over its entire length. The emergency activation means is thereby no longer only reachable at a fixed, predetermined location, but rather can be positioned over the length of the rail, for example respectively near an operating personnel. The flexibility in the positioning of the emergency activation means is thereby increased via a simple and uncomplicated realizable rail connection. At the same time, a connection by means of additional cables (that, in addition to lacking flexibility with regard to location, also represent a stumbling danger and would cause cable tangles) can be foregone.

In an advantageous embodiment, the rail comprises a test signal emitter means to emit a test signal on an optical basis. This optical connection is to be viewed as being implemented in hardware, and therewith sufficiently safe, due to the hardware-based mutual connection between the rail and the emergency activation means attached to it. It exhibits the advantage that the contact of the rail is safe insofar as possible health damages due to electrical voltages or currents are impossible. Moreover, it is insusceptible to interferences due to contact with conductive liquids that can frequently occur, in particular in medical or laboratory-technical work environments.

In a further advantageous embodiment of the invention, the rail is connected with an emergency control device via which a test signal can be generated that comprises an identifier that can be unambiguously associated with a specific emergency activation means. An emergency activation means that comprises an identification analyzer that can detect and identify the unambiguous identifier can thereby be individually activated and be flexibly distributed over the rail together with further emergency activation means. It is thereby possible that the individual emergency activation means do not mutually interfere, and that the emergency control device can be correctly activated independent of the others upon activation of each individual emergency activation means. This increases the flexibility in the arrangement of emergency activation means.

With reference to the figures, as an example for a technical device, a patient positioning table 1 is shown in FIG. 1 as it is, for example, used in medical diagnostics or therapy. However, it could also, for example, be a diagnostic or medical-technical device, an industrial production device, a building crane or assembly crane or erecting crane, or other remotely controllable technical devices. Moreover, the technical device could also be provided for exclusive attachment of the remote control 5, while this serves for the control and monitoring of a further, different technical device. Mechanically and effectively with regard to its emergency function, the rail 3 thus does not have to be connected with the same technical device.

Patient positioning tables can exhibit extensive possibilities to change the position of the patient lying thereupon. For example, the height of the table can be automatically changed, and it can be automatically moved forwards or backwards. It is thereby enabled to position the patient in a suitable manner in a further device (not shown) such as, for example, an x-ray device or an MR device. Moreover, as the case may be, it is possible that that the mentioned further medical-technical devices are controlled from the patient positioning table 1.

The patient positioning table 1 comprises a rail 3 to which one or more emergency activation means 5 can be attached. An emergency activation means 5 attached to the rail 3 can be flexibly shifted over the entire free length of the rail 3. The rail 3 extends over a greater part of the length of the patient positioning table 1 in order to be able to optimally, flexibly shift an emergency activation means respectively to the most suitable position. However, the rail 3 does not have to be integrated into the patient positioning table 1; instead it can also be positioned independent of it. Its positioning can ensue flexibly and independently of the technical device at which, as the case may be, emergency measures (for example a deactivation according to emergency) are to be triggered.

In the image, the rail 3 comprises two grooves running in parallel that both exhibit a T-shaped profile. The emergency activation means 5 can be securely anchored in the rail 3 via the T-shaped profile, and at the same time can be flexibly shifted in it. In other embodiments, instead of a T-shaped profile, the rail 5 is fashioned with another profile, as a railing or as permanent magnet rail. Dependent on the design of the rail 3, an emergency activation means 5 attached to it can be shifted either only in the longitudinal direction or (in particular in an embodiment with permanent magnets) also in the transverse direction.

The rail 3 is connected with an emergency control device 7. This serves to emit the necessary test signals to the rail 3 and to receive the response signals on whose basis an emergency measure should be triggered. The test signals are emitted via the emergency control device 7 to the test signal emission means 9 of the rail 3, where they can be received by the emergency activation means 5. The response signal of the emergency activation means 5 can be emitted and forwarded to the rail 3 via the response signal reception means 11.

The test signal emission means 9 and the response signal reception means 11 extend over the entire rail 3, such that an emergency activation means 5 attached to the rail 3 receives the test signal at any possible shift position and can emit the response signal to the rail 3. Receipt and emission of the test and response signals are thus independent of the shift position of the emergency activation means 5 attached to the rail 3. Given a rail 3 extended only in the longitudinal direction and an emergency activation means 5 that can be shifted thereon only in the longitudinal direction, receipt and emission of the test and response signal are thus independent of the longitudinal position of the emergency activation means 5.

The test signals emission means 9 and the response signal reception means 11 are respectively provided with their own groove of the rail 3 in the illustrated exemplary embodiment. However, it would be equally possible to arrange both in a single groove, or to provide further grooves for the production of the mechanical or signal connection.

The test signal emission means 9 of the rail 3 can be fashioned in a first preferred embodiment as an electrical contact. By electrical contact, what should be understood is a contact means that enables a direct electrical connection based on mutual contact. The contact is preferably formed by a metallic contact surface that extends over the entire length of the E-stop rail and, for example, enables the production of a galvanic contact. It is thereby possible to produce an electrical connection over the entire length of the rail to an emergency activation means 5 attached to the rail 3, for which the emergency activation means 5 must merely in turn comprise an electrical contact. The electrical contact on the side of the emergency activation means 5 can therefore likewise be formed by a metallic contact surface.

The response signal reception means 11 can also be realized as an electrical contact in a particularly simple manner, for example likewise via a metallic contact surface that extends over the entire length of the rail 3.

Instead of electrical contacts, in a second preferred exemplary embodiment optical connections are provided in that, for example, the test signal emission means 9 is fashioned, for example, as a light-emitting diode chain or light conductor and can emit an optical signal. The use of an optical signal in place of an electrical signal makes the signal connection insensitive to contact with electrically conductive liquids, for example laboratory chemicals or blood. However, in return the sensitivity to optically opaque contaminations and optically effective objects such as, for example, a reflective surface of a glass or metallic receptacle is increased.

Just like the test signal emission means 9, the response signal reception means 11 can also work on the basis of an optical signal connection. For this, it can be formed via a chain of photodiodes in order to be able to receive optical signals from an emergency activation means 5, or as fluorescing fibers in which optical signals from an emergency activation means 5 trigger a fluorescence phenomenon that is then conducted by the fibers to the emergency control device 7.

With regard to the susceptibility to contaminations, undesired contact with liquids or undesired contacts by patients or operating personnel, the E-stop rail is preferably arranged laterally on the device, such that on the one hand an attached emergency activation means 5 is easily accessible, but on the other hand interfering influences coming from above are more improbable. Moreover, it is possible to cover the rail 3, for example via a flexible rubber lip or a bracing brush, in order to achieve an additional protection from interfering influences.

The emergency activation means 5 is shown according to the invention in FIG. 2. It comprises a contact 13 that is formed in the illustrated embodiment via two T-shape-profiled rail runners. The T-profiles are fashioned such that they can be inserted into the previously specified rail 3 and can be freely shifted therein. In this sense, they represent the negative profile of the profile of the rail 3. All mutual connecting pieces of the rail 3 and the emergency activation means 5 are adapted to one another (for example in their profile, their size or in the possible mutual separation of a plurality of grooves or rail runners) such that the ability of the emergency activation means 5 to be inserted into the rail 3 is ensured.

A test signal emission means 15 that is attached to one of the two rail runners is arranged at the contact 13. In a first preferred embodiment, it can be formed by an electrical contact that is situated in a metallic contact surface on a surface of the rail runner. However, the entire rail runner can also be fashioned as an electrical contact, in that it is universally comprised of metal or another conductive material.

In a second preferred embodiment, the test signal emission means 15 can also be fashioned to receive optical signals, in that it either comprises one or more photodiodes or forms an optical signal path via which optical signals can be conducted into the inside of the emergency activation means 5.

Furthermore, a response signal emission means 17 is provided that is arranged on the other of the two rail runners. Dependent on the implementation of the emergency activation means 5, it can be arranged on the same rail runner as the test signal reception means 15; additionally, further rail runners can be provided for this. The response signal emission means 17 likewise either comprises an electrical contact or is implemented such that it can emit optical signals. These can either be generated by one or more light-emitting diodes or be conducted via an optical signal path from the inside of the emergency activation means 5 to the response signal emission means 17.

The emergency activation means 5 also comprises an emergency key 19 or button, via the activation of which the emission of the response signals can be influenced or, respectively, an emergency signal can be caused that leads to the triggering of an emergency measure, for example a E-stop function. For example, an electrical or optical signal connection can be closed or, respectively, interrupted via the emergency key 19. It is implemented such that it is easily accessible and operable by an operating personnel. Moreover, it can in a simple manner exhibit a signal color, for example red, in order to make its recognition as an emergency key 19 easier.

Exemplary function groups with which a realization of the invention is possible are shown in FIG. 3. This is primarily an E-stop switch 6 on the side of the emergency activation means 5. The E-stop switch 6 is symbolized in the illustrated embodiment as an electrical component, however it can also be an optically-functioning element. Upon operation by an operating personnel via the emergency key 19 to influence, it serves to influence the signal path between the test signal reception means 15 and the response signal emission means 17. In the simplest embodiment, the signal path is interrupted by the E-stop switch 6. For this, an electrical switch can be opened or an optical signal path can be blocked.

In the illustrated configuration, the test signal reception means 15 is connected with the test signal emission means 9, meaning the emergency activation means 5 is attached to the rail 3 and the mutual hardware-based connection is closed. The response signal emission means 17 is likewise connected with the response signal reception means 11.

The test signal is generated by a test signal generator 21 and transmitted to the test signal emission means 9 on the side of the emergency activation means 7 that is likewise connected with the rail 3. The test signal can be an electrical potential that can either be transmitted via an electrical contact or be transduced into an optical signal via a light-emitting diode chain.

In a first embodiment, the test signal can be a simple on/off signal, meaning either a signal is transmitted or the transmission of the signal is blocked. In a second embodiment, it can comprise a signal series that can encode further information. For example, the test signal can comprise a bit sequence that represents an identifier that can be unambiguously associated with a specific emergency activation means 5 from a plurality of emergency activation means. For example, at a technical device, a specific number of emergency activation means 5 can be provided that are individually, serially numbered. The test signal can then comprise an identifier for unambiguous identification of a specific emergency activation means 5 that corresponds to the individual number of the module. A simple identifier is thereby implemented that can be encoded with a few bits.

A possibility to enable the use of precisely two emergency activation means 5 in a common rail 3 exists in that each of the two emergency activation means 5 can conduct current only in one direction, for example via use of a diode. As a test signal, an alternating electrical signal is then emitted that is conducted in each phase by one of the two emergency activation means 5. If one of the two emergency activation means 5 is activated and its electrical conduction is thereby blocked, only one of the two phases of the alternating test signal is still conducted and is emitted as a response signal, namely via the not-activated emergency activation means 5.

If a plurality of emergency activation means 5 are connected with the rail 3, the emergency control device 7 must thus be set up such that it generates an individual associable test signal for each emergency activation means 5 via the test signal generator 21. In this manner, it is ensured that the emergency activation means 5 can be queried independent of one another. The test signal generator 21 can thereby be realized completely implemented in hardware as a purely electrical component, in order to prevent particularly high demands on safety-relevant software. However, it can also be conceived using a software-controlled device.

In another preferred embodiment, the mutual use of a plurality of emergency activation means 5 is enabled, in that the emergency activation means 5 emit individually encoded response signals independent of the test signal. They thereby generate the individual encoding themselves. The generation of individual test signals in the test signal generator 21 can thereby be foregone, and only the evaluation of the individual response signals must thereby ensue in the emergency control device 7.

However, depending on the mode of operation of the emergency control device 7, a plurality of emergency activation means can also be used without associable encoded test signals, in that the function of the emergency activation means 5 is to produce a signal connection between the test signal emission means 9 and the response signal reception means 11 upon activation. In this constellation, the triggering of the emergency measure via activation of each individual emergency activation means 5 installed on the rail 3 would be possible without having to use an individual associable test signal.

Furthermore, a response signal electronic 23 is provided that can receive a response signal from the emergency activation means 5 via the response signal reception means 11. The response signal electronic is realized completely implemented in hardware as a purely electrical component, particularly in order to prevent high demands on safety-relevant software; however, it can also be conceived using a software-controlled device.

The response signal electronic 23 is fashioned such that, upon receiving a signal that is generated via activation of an emergency activation means 5, a signal is emitted to the technical device that triggers the emergency function of the technical device. For this purpose, it comprises a connection to the technical device—in the illustrated exemplary embodiment, thus to the patient positioning table 1. However, it can also be used to disconnect another technical device than that to which it is attached, for example a spatially separately arranged x-ray voltage generator.

Given use of individually encoded test signals for a plurality of emergency activation means 5, the response signal electronic 23 is in the position to individual evaluate the response signals of the individual modules. For this purpose, it must be programmed such that it knows the number of the emergency activation means 5 or, respectively, the entirety of the individual response signals, such that it can trigger the E-stop function upon absence of a specific response signal. For example, the configuration of the emergency activation means 5 can be programmed using dipswitches or jumpers. In this manner, the response signal electronic 23 can test at any time whether the entirety of all emergency activation means 5 would not be activated. If a single response signal changes, the cause for this exists either in an operation of the corresponding emergency activation means 5 or in an error function of the same. Both cases require the triggering of an emergency measure.

Figure 4:
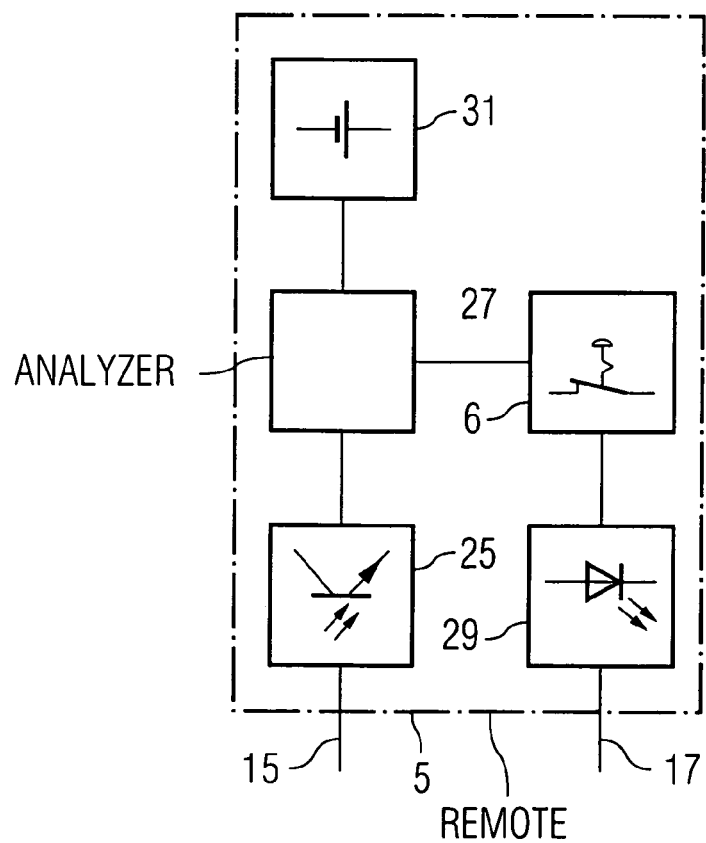
FIG. 4 is a functional block diagram of the electrical function groups of the E-stop module according to the invention.

The electronic components on the side of the emergency activation means 5 based on the use of optical signals are schematically shown in FIG. 4. The optical test signal is received and conducted to a photodiode 25 via the test signal reception means 15. The photodiode 25 transduces the optical test signal into an electrical signal and forwards this to an identification analyzer 27. The identification analyzer 27 has the task to differentiate the test signal from possible interference signals, to identify and (if necessary) to recognize an individual identifier of the test signal unambiguously associated with one the remote 5. It analyzes the identifier of the test signal as to whether it is associated with the respective emergency activation means 5. It is implemented on a purely hardware basis as an electronic component.

If a test signal individually associated with the emergency activation means 5 is recognized, this is forwarded to the E-stop switch 6 via which it reaches a light-emitting diode 29. The identification analyzer 27 emits a likewise individually encoded response signal. This can either be the unchanged, forwarded test signal or an especially generated response signal with (as the case may be) changed bit sequence.

Should the energy supply of the emergency activation means 5 not ensue via the rail, a possible necessary supply voltage can be ensured via a supply voltage 31 that, for example, can be realized as a battery or a rechargeable battery. The emergency activation means 5 can thereby be conceived such that a rechargeable battery is automatically charged again via the rail 3 upon contact with the rail 3.

Upon a closed connection in the E-stop switch 6, the response signal emitted by the identification analyzer is forwarded to the light-emitting diode 29 and is there transduced back into an optical signal. The optical response signal is emitted via the response signal emission means 17. As soon as the E-stop switch 6 is activated by an operating personnel, the connection between identification analyzer 27 and light-emitting diode 29 is interrupted, and it no longer generates a response signal. The absence of the response signal is emitted to the rail 3 as a signal change and can be detected by the emergency control device 7 in order to trigger the emergency measure.

While the emergency activation means 5 in the illustrated exemplary embodiment comprises electrical components, it can instead comprise an electrical conductor that is interrupted by the E-stop switch 6. The possibility also exists that it comprises an optical signal path that, for example, is formed via light conductors and mirrors, and that is blocked by the E-stop switch 6 in that, for example, a light-impermeable gate is inserted into the signal path.

In addition to the activation of the emergency activation means 5 by an operating personnel, an automatic activation can additionally be provided upon detection of a predeterminable circumstance, for example a threshold of a physiological parameter of a patient, or a safety-critical function parameter of a technical device, or a chemical environment parameter. For this purpose, the emergency activation means 5 can either comprise a corresponding sensor (for example a chemical or temperature sensor) or a connection to receive a sensor signal, for example from a patient EKG device.

Although other modifications and changes may be suggested by those skilled in the art, it is the intention of the inventors to embody within the patent warranted hereon all changes and modifications as reasonably and properly come within the scope of their contribution to the art.

We claim:

1. A safety device that is connectable to a technical device, comprising:
   a rail;
   an emergency activation apparatus selectively attachable to said rail so that said emergency activation apparatus is shiftable along said rail, said emergency activation apparatus being operable to signal an emergency condition;
   said rail emitting a test signal that is received by said emergency activation apparatus while said emergency activation apparatus is attached thereto independent of a shift position;
   said emergency activation apparatus emitting a response signal that is received by said rail independent of its shift position, the safety device being fashioned such that a signal is emitted to the technical device dependent on a receipt of the response signal, a change in said response signal indicating the emergency condition.

2. A safety device according to claim 1, wherein said rail includes a test signal emission apparatus via which the test signal is emitted.

3. A safety device according to claim 2, wherein an optical test signal is emitted via said test signal emission apparatus.

4. A safety device according to claim 2, wherein an electrical test signal is emitted by said test signal emission apparatus.

5. A safety device according to claim 1, wherein said rail includes a response signal reception apparatus via which the response signal is received.

6. A safety device according to claim 5, wherein an optical response signal is received via said response signal reception apparatus.

7. A safety device according to claim 5, wherein said response signal reception apparatus includes a fluorescing fiber.

8. A safety device according to claim 5, wherein an electrical response signal is received via said response signal reception apparatus.

9. A safety device according to claim 1, further comprising:
an emergency control device connected to said rail via which at least one of the test signal is generated and the response signal is received.

10. A safety device according to claim 9, wherein said emergency control device generates at least one of a test signal that includes an identifier that is unambiguously associated with a specific emergency activation apparatus and a response signal is received that includes an identifier that is unambiguously associated with a specific emergency activation apparatus.

11. A safety device as claimed in claim 1, wherein said emergency condition results in deactivation of said technical device.

12. A technical device that is connected with a safety device, comprising:
a rail;
an emergency activation apparatus selectively attachable to said rail so that said emergency activation apparatus is shiftable along said rail, said emergency activation apparatus being operable to indicate an emergency condition;
said rail emitting a test signal that is received by said emergency activation apparatus while said emergency activation apparatus is attached thereto independent of a shift position;
said emergency activation apparatus emitting a response signal that is received by said rail independent of its shift position, the safety device being fashioned such that a signal is emitted to the technical device dependent on a receipt of the response signal, a change in the response signal indicating an emergency condition.

13. A technical device according to claim 12, wherein said technical device is a medical-technical device.

14. A technical device as claimed in claim 12, wherein said emergency condition results in deactivation of said technical device.

15. An emergency activation system, comprising:
an emergency activation apparatus;
a rail to which said emergency activation apparatus is attachable and on which said emergency activation apparatus is shiftable, said rail emitting a test signal that is received by said emergency activation apparatus independent of a shift position on said rail, and said emergency activation apparatus emitting a response signal dependent on a receipt of the test signal, said rail receiving said response signal independent of the shift position of said emergency activation apparatus.

16. An emergency activation system according to claim 15, further comprising:
a test signal reception apparatus via which the test signal is received.

17. An emergency activation system according to claim 16, wherein an optical test signal is received via said test signal reception apparatus.

18. An emergency activation system according to claim 16, wherein an electrical test signal is received via said test signal reception apparatus.

19. An emergency activation system according to claim 15, further comprising:
a response signal emission apparatus via which the response signal is emitted.

20. An emergency activation apparatus according to claim 19, wherein an optical response signal is emitted via said response signal emission apparatus.

21. An emergency activation apparatus according to claim 19, wherein an electrical response signal is emitted via said response signal emission apparatus.

22. An emergency activation apparatus according to claim 15, further comprising: an emergency key dependent on whose operation the response signal is emitted.

23. An emergency activation apparatus according to claim 22, further comprising: an electrical E-stop switch that is activated via operation of said emergency key.

24. An emergency activation apparatus according to claim 22, further comprising:
an optical signal path that is interrupted via operation of said emergency key.

25. An emergency activation apparatus according to claim 15, further comprising: an identification analyzer.

26. An emergency activation apparatus according to claim 25, wherein said identification analyzer analyses an individual identifier is included in a received test signal, and said identification analyzer emits a response signal dependent on a result of the analysis.

27. An emergency activation apparatus according to claim 25, wherein a response signal having an individual identification is emitted via said identification analyzer.

28. An emergency activation apparatus according to claim 15, wherein said emergency apparatus is automatically operated upon detection of a predeterminable circumstance.

29. An emergency activation system as claimed in claim 15, wherein a change in said response signal results in deactivation of said technical device.

* * * * *